Oct. 10, 1933.    W. BRUBAKER    1,930,037
ICE CREAM DISPENSER
Filed Sept. 28, 1929    2 Sheets-Sheet 1

Oct. 10, 1933. W. BRUBAKER 1,930,037
ICE CREAM DISPENSER
Filed Sept. 28, 1929  2 Sheets-Sheet 2

Patented Oct. 10, 1933

1,930,037

UNITED STATES PATENT OFFICE 1,930,037

ICE CREAM DISPENSER

Wesley Brubaker, Savannah, Ohio

Application September 28, 1929
Serial No. 395,816

13 Claims. (Cl. 226—125)

This invention relates to improvements in ice cream dispensers of the general character set forth in Letters Patent No. 1,704,784 issued to me on March 12, 1929.

The objects attained in the later improvements of the invention consist in a mechanical dispenser for serving ice cream in the retail trade, preferably in pastry containers, similar to the common ice cream cones, which may be of any shape suitable for filling with ice cream from the mechanical dispenser in accurately measured portions.

A feature of the improved dispenser consists in a container for ice cream comprising a series of telescopically arranged, tubular sections which are collapsible, one section within another, incidental to serving the cream from the dispenser. Collapsing of the container one section into another acts to reduce the fluid friction of the ice cream in the container as the body of the cream is moved toward the discharge end. Thus the ice cream can be served from the container with the minimum of manual force. Also there is not enough pressure exerted on the cream to materially change its consistency.

The collapsible containers are provided in standard measure sizes, and are suitable for filling the same as common ice cream cans, the full cans being readily connectible to and becoming part of the mechanical dispenser for serving the cream in individual portions, the dispenser as a whole being placed, as usual, in an ice box. The empty containers are removed from the dispenser and are replaced with filled containers so that only one dispenser is required for serving the ice cream.

An important structural feature of the improved dispenser consists in means, having particular reference to the collapsible can, confining all operable parts within the normal height of the structure, which permits of using the dispensers in ice boxes commonly used in the ice cream retail trade.

In serving ice cream from the dispenser, the container is collapsed by means of manually operable feed screws which act to move the telescopic sections together until the sections are fully nested one within another, the ice cream being delivered into the serving trays, or into other suitable containers for individual portions by a mechanical feeder incidental to the displacement of the cream as the can is collapsed.

A feature of operating convenience consists in an arrangement of split threaded bearings operably associated with the feed screws for collapsing the containers which permits, when the bearings are separated, of lowering the base upon which the cans are supported without operating the feed screws in inverse direction, thus saving time and labor in replacing the cans.

While the preferred form of receptacle for serving ice cream from the dispenser is the common pastry cone, or any suitable shape of pastry receptacle, the cream may be served as readily in a non-edible receptacle, such as a paper dish or plate.

The structure of the improved dispenser in the character and arrangement of its parts is designed for low cost production, the mechanism being light and durable and of simple character throughout, that will not get out of order, other than normal wear, incidental to its use. For effecting lightness of construction certain parts of the structure may be made of light metal, such as aluminum.

These and other objects attained in the invention will be apparent from the accompanying drawings and the following detailed specification, the principle of the invention and the novel structural features as herein set forth being defined in the appended claims.

In the drawings:

Fig. 5 is a detail view of the feeder for delivering the ice cream from the can.

Figs. 6, 7, 8 are plan, end and side views respectively of a support for the receptacles for dispensing the cream.

Figure 1:
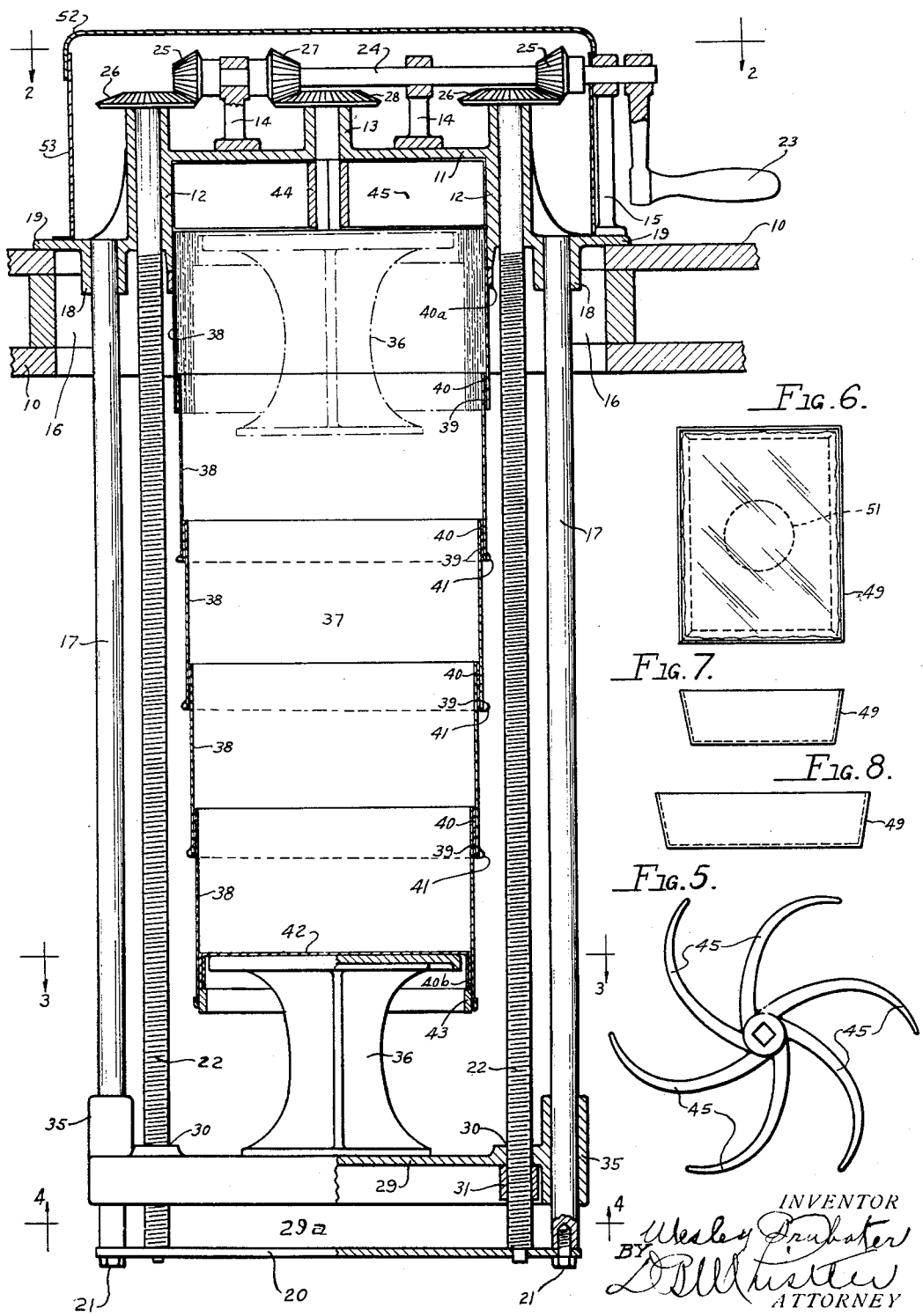
Fig. 1 is a view in sectional elevation of the dispenser on line 1—1 of Fig. 2.

As illustrated in the drawings, 10 represents part of the structure of an ice box, or electrical refrigerator, in which the ice cream dispenser is supported. The dispenser consists of a head bracket 11, including bearings 12—13, 14, 15, which covers the aperture 16 in the top of the ice box. Depending rods 17 are fixed in bosses 18 of the supporting flange 19 of bracket 11, the rods supporting at their lower ends a base plate 20 which is connected to the rods by screws 21.

Supported in the opposite bearings 12 are screw shafts 22, the lower ends of the shafts being supported in base plate 20. Operation of shafts 22 is effected by a hand crank 23, shaft 24 and gears 25, 26 the shaft being supported in bearings 14, 15.

Connected to shafts 22 is a base plate 29 which is apertured at 30—30 to move free over the shafts. Below plate 29 and operably connected to opposite shafts 22 are threaded bearings 31, the opposite half sections of the bearings being hinged together and secured to plate 29 at 32. The bearings are normally held together in operating relation with shafts 22 by springs 33. Screws 34, supported in plate 29 and having their ends tapered and in engagement with the adjacent ends of the split bearings, serve for spreading the bearings and disengaging the same from shafts 22.

Outward of bearings 31, base 29 is provided with bearings 35 which slide on rods 17. Extended upward from the base, preferably formed integrally therewith, is a column 36 upon which the sectional container 37 is supported.

The sections 38 of container 37 are of equal height and of unequal diameter, the diameters being graduated in decreasing ratio from the upper section to the lower section for effecting a sealed, sliding fit between the sections and for nesting all the sections within the upper sections, as indicated in dotted outline in Fig. 1, when the container is collapsed.

For sealing the telescopic joints between the container sections, the upper sections at each joint is provided with a sealing ring 39 and the coacting lower section with a sealing ring 40. The edge of one ring 39—40 contacts with the adjacent edge of the other when the container is fully expanded, which permits the sections to slide one into the other, but prevents the sections coming apart. An outer flange or ring 41 at the lower edge of each section, except the upper section, acts to limit the upward movement of the section relative to the adjoining section above.

In the lowermost section 38 is an operable bottom 42 which moves telescopically relative to that section, the lower edge of the section being provided with a relatively heavier ring 43 which acts to stiffen the bottom edge of the lower section of the can.

By turning crank 23 feed screws 22 are rotated in bearings 31 and an upward movement is effected of the base members 29—36 which acts to collapse the container. The upward pressure is on the body of the ice cream, which is delivered into the serving receptacle. The container is fully collapsed at the upper limit of movement of the base 29—36, the upper section 38 remaining stationary during the entire feeding action.

Directly above upper section 38 is a feeding chamber 44 in which a rotatable feeder 45 operates, the feeder being connected to the crank shaft 24 by bevel gears 27—28, and consisting of a plurality of radially extended curved arms spaced one from another circumferentially for effecting a feeding action on the ice cream, the cream being delivered in thin slices through an aperture 46 in the annular wall of chamber 44.

Figure 2:
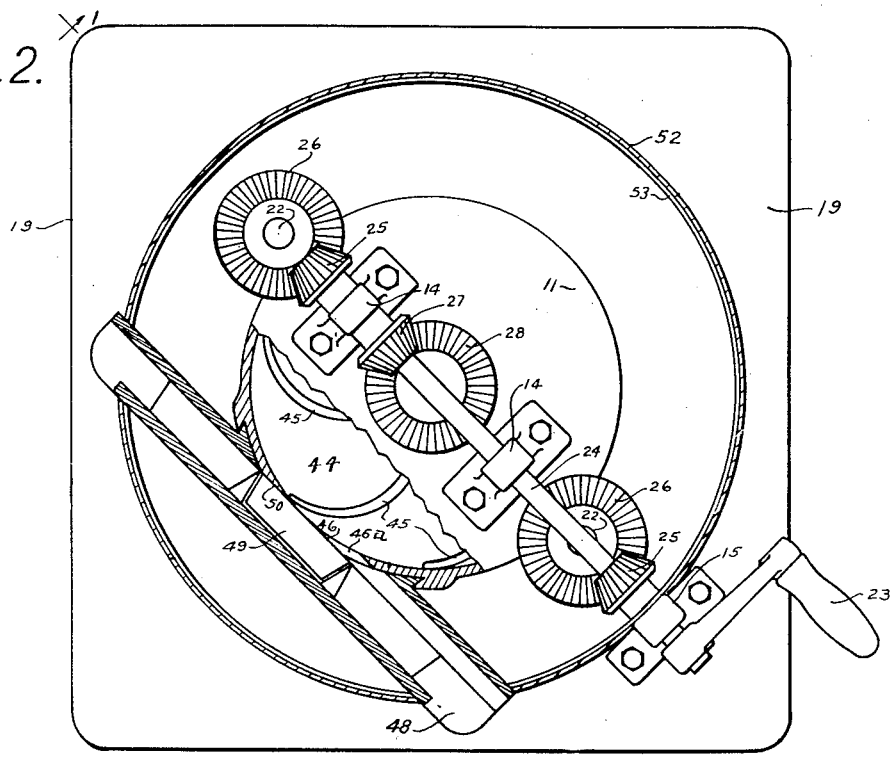
Fig. 2 is a top plan view, partially in section of Fig. 1.
Figure 3:
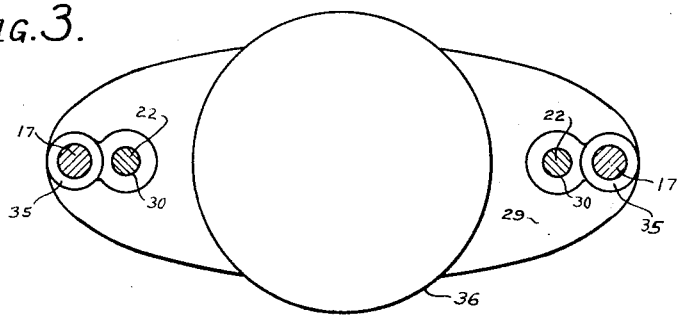
Fig. 3 is a section on the line 3—3 of Fig. 1, omitting the container.
Figure 4:
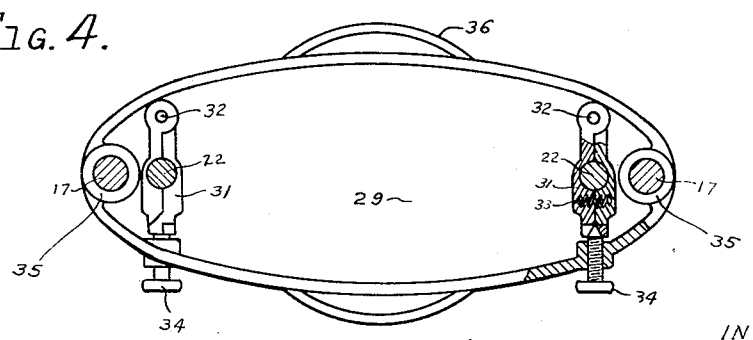
Fig. 4 is a transverse sectional view on line 4—4 of Fig. 1.

Adjacent the discharge aperture 46 is a guide 48 in which the supporting trays 49 for the pastry ice cream receptacles are moved into position opposite aperture 46 for receiving the cream, the trays 49 acting to practically seal the edges of the aperture and to prevent the discharge of cream over the edges of the serving receptacles. As the trays 49 are moved outward in guide 48 a cutting edge 50 of the annular ring 47 acts to level the cream in the receptacles, thus effecting accurate measurement of the portions served. As shown in Fig. 2 the discharge aperture 46 is enlarged at 46a which permits of filling the serving receptacles rounding full, the guide 48 being also enlarged outward of the discharge aperture to permit of delivering the filled receptacles through the guide. Consequently when the tray is moved toward the left in Fig. 2, after the receptacle has been filled, the edge 52 will shear the ice cream off level with the edges of the receptacle, but when the tray is moved toward the right the rounded edge 46a will shear the ice cream in rounded form.

Trays 49 serve for supporting the pastry receptacles for the ice cream, as they are moved into and out of filling position in guide 48. An aperture 51 in the bottom of tray 49 serves for pressing the filled receptacles outward with the fingers for removing the same. While the pastry serving receptacles as herein shown and described, are rectangular shaped and relatively shallow, it will be apparent that the improved dispenser is not limited to the use of any given shape of serving receptacle. The guides 48 and trays 49 can readily be modified for any suitable shape of serving receptacle.

The mechanism on bracket 11 is enclosed in a metal housing 52—53 which serves for effecting sanitation at the serving end of the can.

When the can is in serving position as indicated in Fig. 1, the upper end of the upper section 38 extends into the chamber 44 and seals the connection. Upon releasing the split bearings 31 for replacing an empty can with a filled can, the base 29—36 moves down into the space 29a which permits the top section 38 of the can to clear the chamber 44 when the filled can is placed on base 29—36. The can is then moved into operating relation with the serving chamber 44 by turning crank 23.

I claim as my invention:

1. A dispenser including a container for a plastic substance comprising a plurality of sections arranged telescopically and collapsible one section into another, threaded screw shafts and divided threaded bearings operably connected therewith for collapsing the sections for removing the substance from the container, the bearings being separable for extending the sections, after the same have been collapsed, without operating the screw shafts in inverse direction.

2. In a dispenser for ice cream or the like, a container comprising an uppermost section and a plurality of lower sections telescopically arranged with relation one to another and with relation to said uppermost section, a movable bottom for the lowermost section, and means for moving said bottom through said lowermost section and for moving each lower section into the section next above the same, whereby when the several sections have been collapsed said bottom will be adjacent to the top of said uppermost section.

3. In a dispenser for ice cream or the like, a container comprising an uppermost section and a plurality of lower sections telescopically arranged with relation one to another and with relation to said uppermost section, a movable bottom for the lowermost section, means for moving said bottom through said lowermost section and for moving each lower section into the section next above the same, whereby when the several sections have been collapsed said bottom will be adjacent to the top of said uppermost section, and an operable device arranged above said uppermost section to discharge the ice cream forced from said uppermost section by the collapsing of the several sections.

4. A dispenser for ice cream or the like comprising a chamber having a discharge opening, a container comprising a plurality of sections each adapted to contain ice cream, the several sections being telescopically arranged for movement one into the other and the uppermost section having communication with said chamber, a movable bottom for the lowermost section, and means for moving said bottom through said lowermost section to a point near the top thereof and for then successively moving said lowermost sections upwardly until the several lowermost sections are nested in said uppermost section.

5. A dispenser for ice cream or the like comprising a chamber having a discharge opening, a container comprising a plurality of sections each adapted to contain ice cream, the several sections being telescopically arranged for movement one into the other and the uppermost section having communication with said chamber, a movable bottom for the lowermost section, means for collapsing said container comprising a part to move said bottom to a position near the top of said lowermost section and a part to then engage the lowermost section and cause the several sections to be moved one into the other.

6. A dispenser for ice cream or the like comprising a chamber having a discharge opening, a container comprising a plurality of sections each adapted to contain ice cream, the several sections being telescopically arranged for movement one into the other and the uppermost section having communication with said chamber, a movable bottom for the lowermost section, means for collapsing said container comprising a part to move said bottom to a position near the top of said lowermost section, a part to then engage the lowermost section and cause the several sections to be moved one into the other, operable means in said chamber for discharging the ice cream therefrom, and means for simultaneously actuating said collapsing means and said discharging device.

7. A dispenser for ice cream or the like comprising a supporting structure having a chamber provided with a discharge opening, a container comprising a plurality of telescopic sections each adapted to contain ice cream, and each lower section being movable into an upper section, the uppermost section having communication with said chamber, a movable bottom for the lowermost section, a member carried by said supporting structure, arranged beneath said container and having a part extending into the lowermost section to engage said movable bottom, said part being so arranged with relation to said member that when said bottom has been moved to a point near the top of said lowermost section said member will engage said lowermost section and will successively move each lower section into an upper section, and means for moving said member toward said chamber.

8. A dispenser for ice cream or the like comprising a supporting structure having a chamber provided with a discharge opening, a container comprising a plurality of telescopic sections each adapted to contain ice cream, and each lower section being movable into an upper section, the uppermost section having communication with said chamber, a movable bottom for the lowermost section, a member carried by said supporting structure, arranged beneath said container and having a part extending into the lowermost section to engage said movable bottom, said part being so arranged with relation to said member that when said bottom has been moved to a point near the top of said lowermost section said member will engage said lowermost section and will successively move each lower section into an upper section, a rotatable device mounted in said chamber for discharging the ice cream therefrom, screws having operative connection with said member, and a single operating device for actuating said screws and said rotatable device.

9. In a dispenser for ice cream or the like, a container comprising a plurality of telescopically arranged sections each adapted to contain ice cream and each lower section being movable into an upper section, a structure having a chamber arranged above said container and provided with a discharge opening, means for collapsing said container and forcing the ice cream into said chamber and discharging it through said opening, and a guideway extending transverse to said opening and adapted to movably support a receptacle in line with said opening.

10. In a dispenser for ice cream or the like, a container comprising a plurality of telescopically arranged sections each adapted to contain ice cream and each lower section being movable into an upper section, a structure having a chamber arranged above said container and provided with a discharge opening, means for collapsing said container and forcing the ice cream therefrom into said discharge chamber and through said discharge opening, a guideway extending across said opening, and a tray slidably mounted on said guideway for movement into and out of line with said discharge opening.

11. In a dispenser for ice cream or the like, a container comprising a plurality of telescopically arranged sections each adapted to contain ice cream and each lower section being movable into an upper section, a structure having a chamber arranged above said container and provided with a discharge opening, means for collapsing said container and forcing the ice cream therefrom into said discharge chamber and through said discharge opening, a guideway extending across said opening, and a tray slidably mounted on said guideway for movement into and out of line with said discharge opening, said structure having at the opposite ends of said discharge opening edges differently arranged with relation to said guideway to remove excess ice cream when said tray is moved from said opening.

12. In a dispenser for ice cream or the like comprising a supporting structure having a chamber provided with a discharge opening, a container comprising a plurality of telescopically arranged sections each adapted to contain ice cream, each lower section being movable into the section next above the same and into the uppermost section and having communication with said chamber, means for moving the several sections one into the other and into said uppermost section, means carried by said supporting structure for movably supporting a receptacle in a position to receive ice cream from said discharge opening, means within said chamber for discharging ice cream through said opening, and stationary means adjacent to said discharge opening for removing any excess of ice cream from said receptacle when the latter is moved from said discharge opening.

13. A dispenser for ice cream or the like comprising a chamber having a circumferential wall provided with a discharge opening, a container comprising a plurality of sections, the uppermost section being in open communication with said chamber and the lower sections being telescopically arranged with relation one to the other and with relation to the uppermost section, means for moving the lower sections into said uppermost section to cause the ice cream to be delivered therefrom to said chamber, and an ejector rotatably mounted in said chamber and comprising a series of curved arms having their ends arranged adjacent to the circumferential wall of said chamber.

WESLEY BRUBAKER.